United States Patent
Hansel et al.

(10) Patent No.: US 11,193,004 B2
(45) Date of Patent: *Dec. 7, 2021

(54) PHOSPHORIC ESTER PREPARATIONS WITH REDUCED HYGROSCOPICITY

(71) Applicant: LANXESS Deutschland GmbH, Cologne (DE)

(72) Inventors: Jan-Gerd Hansel, Bergisch Gladbach (DE); Heiko Tebbe, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 207 days.

This patent is subject to a terminal disclaimer.

(21) Appl. No.: 16/177,714

(22) Filed: Nov. 1, 2018

(65) Prior Publication Data

US 2019/0071556 A1 Mar. 7, 2019

Related U.S. Application Data

(63) Continuation of application No. 14/481,035, filed on Sep. 9, 2014, now abandoned.

(30) Foreign Application Priority Data

Sep. 13, 2013 (EP) .................................... 13184290

(51) Int. Cl.
| | | |
|---|---|---|
| *C08K 5/521* | (2006.01) | |
| *C08K 5/00* | (2006.01) | |
| *C08G 65/335* | (2006.01) | |
| *C10M 105/74* | (2006.01) | |
| *C08G 18/08* | (2006.01) | |
| *C08G 18/42* | (2006.01) | |
| *C08G 18/48* | (2006.01) | |
| *C08G 18/76* | (2006.01) | |
| *C08K 5/523* | (2006.01) | |
| *C09K 8/62* | (2006.01) | |
| *C09K 21/14* | (2006.01) | |
| *C10N 30/00* | (2006.01) | |
| *C10N 40/08* | (2006.01) | |

(52) U.S. Cl.
CPC .............. *C08K 5/521* (2013.01); *C08G 18/14* (2013.01); *C08G 18/42* (2013.01); *C08G 18/48* (2013.01); *C08G 18/7621* (2013.01); *C08G 65/3353* (2013.01); *C08K 5/0066* (2013.01); *C08K 5/523* (2013.01); *C09K 8/62* (2013.01); *C09K 21/14* (2013.01); *C10M 105/74* (2013.01); *C08G 2110/0008* (2021.01); *C10M 2223/04* (2013.01); *C10M 2223/0405* (2013.01); *C10N 2030/66* (2020.05); *C10N 2040/08* (2013.01)

(58) Field of Classification Search
CPC ........ C08G 18/14; C08G 18/42; C08G 18/48; C08G 18/7621; C08G 65/3353; C08G 2101/0008; C08K 5/521; C08K 5/0066; C08K 5/523; C09K 8/62; C09K 21/14; C10M 105/74; C10M 2223/04; C10M 2223/0405; C10N 2030/66; C10N 2040/08

See application file for complete search history.

(56) References Cited

U.S. PATENT DOCUMENTS

| 4,382,042 A * | 5/1983 | Hardy ..................... C07F 9/093 |
| | | 558/115 |
| 9,920,081 B2 * | 3/2018 | Hansel .................... C07F 9/141 |
| 2007/0021516 A1 * | 1/2007 | Hansel .................... C08L 75/04 |
| | | 521/99 |
| 2018/0291156 A1 * | 10/2018 | Tebbe ..................... C08L 75/08 |

FOREIGN PATENT DOCUMENTS

WO   WO 01/18088   *   3/2001

OTHER PUBLICATIONS

Author unknown, ICL Industrial Products Bulletin for "Phosflex 71B Phosflex Flame Retardant Plasticizers", date of publication unknown, pp. 1-3.*

* cited by examiner

*Primary Examiner* — Patrick D Niland

(57) ABSTRACT

The present invention relates to phosphoric ester preparations with reduced hygroscopicity, to use of these as flame retardants and hydraulic fluids, and to polyurethanes which comprise the phosphoric ester preparations of the invention.

12 Claims, No Drawings

PHOSPHORIC ESTER PREPARATIONS WITH REDUCED HYGROSCOPICITY

This application is a continuation of pending U.S. patent application Ser. No. 14/481,035 filed Sep. 9, 2014, with the same title, which claims the right of priority to European Application No. 13184290.8, filed Sep. 9, 2013, the contents of which are hereby incorporated by reference in their entirety.

The present invention relates to phosphoric ester preparations with reduced hygroscopicity, to a method for production thereof, and to the use of these as flame retardants and hydraulic fluids, and also to polyurethanes which comprise the phosphoric ester preparations of the invention.

DESCRIPTION OF THE PRIOR ART

Poly(alkylene phosphates) can be used in various technical applications, for example as lubricants (cf. U.S. Pat. No. 2,632,767), hydraulic fluids (cf. U.S. Pat. No. 4,056,480), plasticizers (cf. U.S. Pat. No. 2,782,128) and as flame retardants (cf. EP 1 746 129 B1, and the European Patent Application No. 12177287.5 which is not a prior publication).

However, a problematic factor in those applications is that the poly(alkylene phosphates) are distinctly hygroscopic, see Example M-CE1. Hygroscopicity is the term used for the property that causes a substance to absorb water from the water vapour present in air. This process causes an uncontrolled rise in the water content of the poly(alkylene phosphates), and this can lead to difficulties in the applications mentioned: the increased water content in hydraulic fluids can lead to the formation of vapour bubbles which can cause undesired compressibility. Flame retardants with undesired water content can cause hydrolysis of the matrix that is to be protected (for example a plastic). In the case of production of polyurethanes, water content in the flame retardants used is always undesired, since it leads to uncontrolled foaming. Even in the case of water-blown polyurethane foams, all of the raw materials should have minimal and constant water content, in order that the properties of the foam can be adjusted in a controlled manner via the exact quantity added of water as blowing agent. In general terms, increased water content can promote the corrosion of metallic materials.

For these reasons, the use of poly(alkylene phosphates) is coupled with protective measures which must prevent contact of the product with humid air along the entire product pathway. By way of example, storage tanks have to be blanketed with inert gas. This increases technical cost.

WO 2001/018088 A1 describes mixtures of oligomeric poly(alkylene phosphates) and non-oligomeric, non-halogenated organophosphorus flame retardants. However, WO 2001/018088 A1 does not address the hygroscopicity problem. WO 2001/018088 A1 gives particular preference to mixtures based on what is known as poly(ethyl ethyleneoxy) phosphate, EtO-[P(=O)OEt-CH$_2$CH$_2$—]$_n$—P(=O)(OEt)$_2$, where the average value of the number of the repeating units $\bar{n}$ is from 2 to 20. Poly(ethyl ethyleneoxy) phosphate is marketed by way of example as Fyrol® PNX by ICL-IP. These mixtures based on poly(ethyl ethyleneoxy) phosphate are described in WO 2001/018088 A1 as flame retardants for polyurethane foams, but feature a considerable disadvantage: that they although they can be successfully processed with polyether polyols they cannot be successfully processed with polyester polyols (see Examples).

It was therefore an object of the present invention to provide products which are based on poly(alkylene phosphates) and which feature reduced hygroscopicity, and which have good processability in polyester polyols.

The said object is achieved via mixtures which comprise certain phosphoric esters alongside an oligomer mixture of poly(alkylene phosphates).

SUMMARY OF THE INVENTION

The present invention therefore provides phosphoric ester preparations characterized in that they comprise
i) an oligomer mixture a) comprising at least three poly(alkylene phosphates) corresponding to the formula (I)

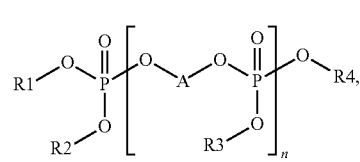

(I)

in which
R$^1$, R$^2$, R$^3$ and R$^4$ are respectively mutually independently a straight-chain or branched C$_1$- to C$_8$-alkyl moiety or a straight-chain or branched C$_1$- to C$_4$-alkoxyethyl moiety,
A is a straight-chain, branched and/or cyclic C$_4$- to C$_{20}$-alkylene moiety, or
A is a moiety of the formula —CH$_2$—CH=CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$— or a moiety of the formula —(CHR$^5$—CHR$^6$—O)$_c$—R$^9$—(O—CHR$^7$—CHR$^8$)$_d$—,
in which
a is an integer from 1 to 5,
b is an integer from 0 to 2,
c and d are mutually independently an integer from 1 to 5,
R$^5$, R$^6$, R$^7$ and R$^8$ are mutually independently H or methyl,
R$^9$ is a moiety of the formula —CH$_2$—CH=CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

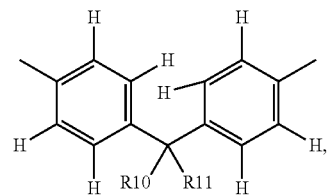

(II)

a moiety of the formula (III)

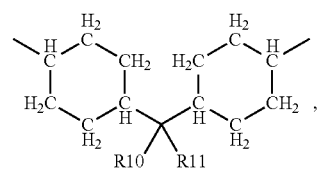

(III)

a moiety of the formula (IV)

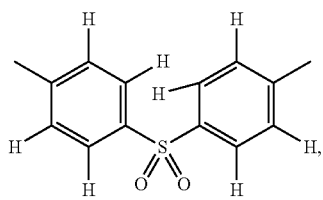
(IV)

or a moiety of the formula —C(=O)—R$^{12}$—C(=O)—, where

R$^{10}$ and R$^{11}$ are respectively mutually independently H or C$_1$- to C$_4$-alkyl or R$^{10}$ and R$^{11}$ together are an optionally alkyl-substituted ring having from 4 to 8 C atoms, R$^{12}$ is a straight-chain, branched and/or cyclic C$_2$- to C$_8$-alkylene moiety, a 1,2-phenylene moiety, a 1,3-phenylene moiety, or a 1,4-phenylene moiety, and n is an integer from 0 to 100, with the proviso that the at least three poly(alkylene polyphosphates) of the formula (I) differ from one another at least in the number n of the repeating units, and the average value of the number of the repeating units $\bar{n}$ of the at least three poly(alkylene phosphates) of the formula (I) is greater than 1.10 and smaller than 2.00, and ii) at least one phosphoric ester b) with solubility of less than 3.0 g/l in water at 25° C.

DETAILED DESCRIPTION OF THE INVENTION

Preference is given to poly(alkylene phosphates) of the formula (I) in which R$^1$, R$^2$, R$^3$ and R$^4$ are identical and are either ethyl, n-propyl, isopropyl, n-butyl, isobutyl or n-butoxyethyl. It is preferable that A in formula (I) is a straight-chain C$_4$- to C$_6$-alkylene moiety.

Preference is further given to poly(alkylene phosphates) of the formula (I) in which A is a moiety of the formula (II), in which R$^{10}$ and R$^{11}$ are identical and are methyl, or is a moiety of the formulae (V), (VI) or (VII),

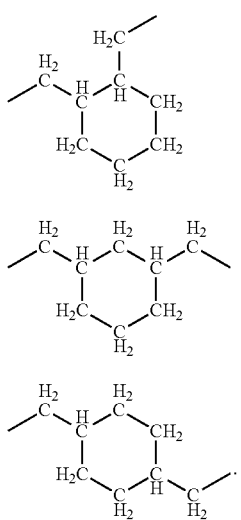

Preference is likewise given to poly(alkylene phosphates) of the formula (I) in which A is a moiety of the formula —CHR$^5$—CHR$^6$—(O—CHR$^7$—CHR$^8$)$_a$—, in which a is a number from 1 to 2 and R$^5$, R$^6$, R$^7$ and R$^8$ are identical and are H or is a moiety of the formula —(CHR$^5$—CHR$^6$—O)$_c$—R$^9$—(O—CHR$^7$—CHR$^8$)$_d$—, in which c and d are mutually independently an integer from 1 to 2, and R$^9$ is a moiety of the formula (II), where R$^{10}$ and R$^{11}$ are identical and are methyl.

Preference is given to phosphoric ester preparations of the invention which comprise an oligomer mixture a) comprising at least three poly(alkylene phosphates) of the formula (I), in which R$^1$, R$^2$, R$^3$ and R$^4$ are respectively mutually independently a straight-chain or branched C$_1$- to C$_4$-alkyl moiety or a C$_1$- or C$_2$-alkoxyethyl moiety, A is a straight-chain or branched C$_4$- to C$_{10}$-alkylene moiety, or A is a moiety of the formula —CH$_2$—CH=CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$— or a moiety of the formula —(CHR$^5$—CHR$^6$—O)$_c$—R$^9$—(O—CHR$^7$—CHR$^8$)$_d$—, in which a is an integer from 1 to 5, b is an integer from 0 to 2, c and d are mutually independently an integer from 1 to 5, R$^5$, R$^6$, R$^7$ and R$^8$ are mutually independently H or methyl, R$^9$ is a moiety of the formula —CH$_2$—CH=CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

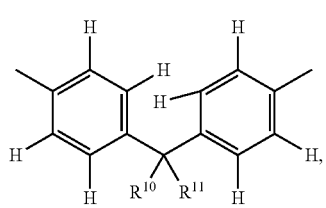
(II)

a moiety of the formula (III)

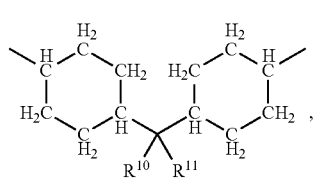
(III)

a moiety of the formula (IV)

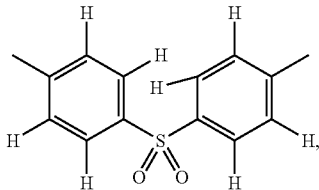

or a moiety of the formula —C(=O)—R$^{12}$—C(=O)—, where

R$^{10}$ and R$^{11}$ are respectively mutually independently H or C$_1$- or C$_2$-alkyl, R$^{12}$ is a straight-chain or branched C$_2$- to C$_6$-alkylene moiety, a 1,2-phenylene moiety, a 1,3-phenylene moiety, or a 1,4-phenylene moiety, and n is an integer from 0 to 100.

Very particular preference is given to phosphoric ester preparations of the invention which comprise an oligomer mixture a) comprising at least three poly(alkylene phosphates) of the formula (I)
in which R$^1$, R$^2$, R$^3$ and R$^4$ are respectively mutually independently a straight-chain or branched C$_1$- to C$_4$-alkyl moiety or an n-butoxyethyl moiety, A is a straight-chain C$_4$- to C$_6$-alkylene moiety, or A is a moiety of the formula —CH$_2$—CH=CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$— or a moiety of the formula —(CHR$^5$—CHR$^6$—O)$_c$—R$^9$—(O—CHR$^7$—CHR$^8$)$_d$—,
in which a is an integer from 1 to 5, b is an integer from 0 to 2, c and d are mutually independently an integer from 1 to 5, R$^5$, R$^6$, R$^7$ and R$^8$ are mutually independently H or methyl, R$^9$ is a moiety of the formula —CH$_2$—CH=CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

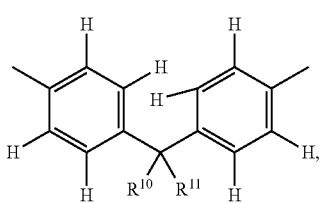

a moiety of the formula (III)

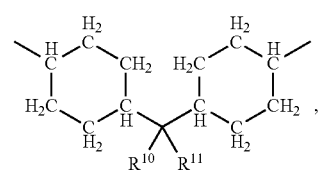

a moiety of the formula (IV)

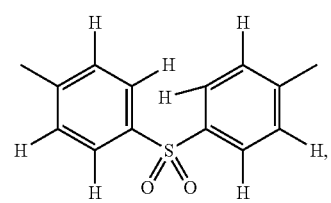

or a moiety of the formula —C(=O)—R$^{12}$—C(=O)—, where

R$^{10}$ and R$^{11}$ are respectively mutually independently H or C$_1$- or C$_2$-alkyl, R$^{12}$ is a straight-chain or branched C$_2$- to C$_6$-alkylene moiety, a 1,2-phenylene moiety, a 1,3-phenylene moiety, or a 1,4-phenylene moiety, and n is an integer from 0 to 100.

Preference is in particular given to phosphoric ester preparations of the invention which comprise an oligomer mixture a) comprising at least three poly(alkylene phosphates) of the formula (I)
in which R$^1$, R$^2$, R$^3$ and R$^4$ are identical and are ethyl, n-propyl, isopropyl, n-butyl, isobutyl or n-butoxyethyl, A is a straight-chain C$_4$- to C$_6$-alkylene moiety, or A is a moiety of the formulae

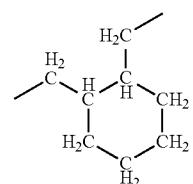

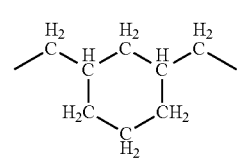

or

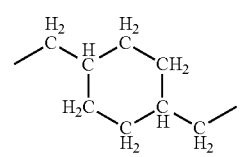

or

A is a moiety —CHR$^5$—CHR$^6$—(O—CHR$^7$—CHR$^8$)$_a$—, in which a is an integer from 1 to 2 and R$^5$, R$^6$, R$^7$ and R$^8$ are identical and are H, or is a moiety —(CHR$^5$—CHR$^6$—O)$_c$—R$^9$—(O—CHR$^7$—CHR$^8$)$_d$—, in which c and d are mutually independently an integer from 1 to 2, R$^5$, R$^6$, R$^7$ and R$^8$ are identical and are H, R$^9$ is a moiety of the formula (II), where R$^{10}$ and R$^{11}$ are identical and are methyl, and n is an integer from 0 to 20.

It is preferable that the oligomer mixtures a) present in the phosphoric ester preparations of the invention and the poly(alkylene phosphates) present therein are halogen-free. For the purposes of the present invention, the expression "halogen-free" means that the poly(alkylene phosphates) of the formula (I) do not comprise the elements fluorine, chlorine, bromine and/or iodine and that the oligomer mixtures a) present in the phosphoric ester preparations of the invention do not comprise any other substances in a quantity that causes content of one or more of the elements fluorine, chlorine, bromine and iodine to be greater than 5000 ppm, based on the oligomer mixture a).

The oligomer mixtures a) present in the phosphoric ester preparations of the invention comprise at least three, preferably more than three different poly(alkylene phosphates) of the general formula (I) which differ from one another at least in the number n of the repeating units and thus in their molar mass. The person skilled in the art uses suitable average values to describe oligomer mixtures of this type, for example the number-average molar mass $M_n$ and the average value of the number of the repeating units $\bar{n}$ in the molecules of the formula (I) present in the oligomer mixture.

The number-average molar mass $M_n$ of the poly(alkylene phosphates) of the formula (I) present in the oligomer mixture a) in the invention is determined via gel permeation chromatography with tetrahydrofuran as eluent against polystyrene standards. This method is known to the person skilled in the art, for example from DIN 55672-1:2007-08. From $M_n$ it is easily possible, by considering the stoichiometry of the formula (I), to calculate the average value of the number of the repeating units $\bar{n}$ in the poly(alkylene phosphates) present in the oligomer mixture a) (see Production Example).

The phosphoric esters b) present in the phosphoric ester preparations of the invention are preferably esters of orthophosphoric acid having identically or differently substituted alkyl, alkylene, alkoxyalkylene, arylalkyl, aryl, arylene or hetaryl moieties. The materials can also be mixtures of various esters of the sort frequently encountered in technical products of this type.

It is preferable that the phosphoric esters b) are compounds of the formula (VIII)

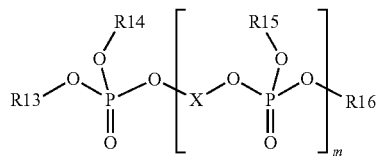

(VIII)

in which

R$^{13}$, R$^{14}$, R$^{15}$ and R$^{16}$ are respectively mutually independently straight-chain or branched C$_4$- to C$_{12}$-alkyl, C$_4$- to C$_{12}$-alkoxyalkyl, C$_3$- to C$_{12}$-chloroalkyl, C$_3$- to C$_{12}$-dichloroalkyl or optionally mono- or poly-C$_1$- to C$_4$-alkyl-substituted C$_6$- to C$_{10}$-aryl, X is a C$_4$- to C$_8$-alkylene moiety, a 1,2-phenylene moiety, a 1,3-phenylene moiety, a 1,4-phenylene moiety or a moiety of the formula (II),

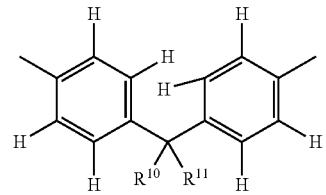

(II)

in which

R$^{10}$ and R$^{11}$ are as defined above, and m is 0 or 1.

It is particularly preferable that the phosphoric esters b) are compounds of the formula (VIII)

in which

R$^{13}$, R$^{14}$, R$^{15}$ and R$^{16}$ are mutually independently optionally mono- or poly-C$_1$- to C$_4$-alkyl-substituted phenyl, X is a C$_4$- to C$_8$-alkylene moiety, a 1,2-phenylene moiety, a 1,3-phenylene moiety, a 1,4-phenylene moiety or a moiety of the formula (II),

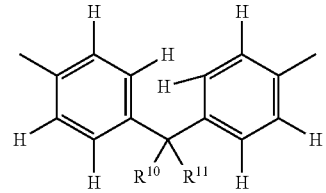

(II)

in which R$^{10}$ and R$^{11}$ are as defined above, and m is 0 or 1.

Examples of the preferred phosphoric esters b) are triphenyl phosphate, diphenyl cresyl phosphate, tricresyl phosphate, isopropylated or butylated aryl phosphates, bisphenol A bis(diphenyl phosphate), resorcinol bis(diphenyl phosphate), hydroquinone bis(diphenyl phosphate), neopentyl glycol bis(diphenyl phosphate), triisobutyl phosphate, tributoxyethyl phosphate, tris(chloroisopropyl) phosphate and tris(dichloropropyl) phosphate and mixtures of these.

The phosphoric esters b) are commercially obtainable products or can be produced by a known method. It is also possible to use technical products as phosphoric esters b). It is preferable here to use those technical products which are termed "neutral" phosphoric esters, i.e. which have an acid number below 10 mg KOH/g, preferably below 5.0 mg KOH/g and particularly preferably below 2.0 mg KOH/g.

In principle, the oligomer mixtures a) can be produced via methods known to the person skilled in the art for the production of alkyl phosphates. By way of example, the oligomer mixtures a) can be produced via the reaction of alkyl dichlorophosphates of the formula MO-POCl$_2$, in which M is a moiety R$^1$, R$^2$, R$^3$ or R$^4$ and R$^1$, R$^2$, R$^3$ and R$^4$ comply with the general and preferred definitions given above, with dihydroxy compounds of the formula HO-A-OH, in which A complies with the general and preferred definitions given above, and with one or more monohydroxy compounds M-OH, in which M is defined as above, or via reaction of dihydroxy compounds of the formula HO-A-OH, in which A complies with the general and preferred definitions given above, with phosphorus oxychloride POCl$_3$ and with one or more monohydroxy compounds M-OH, in which M is a moiety R$^1$, R$^2$, R$^3$ or R$^4$, and R$^1$, R$^2$, R$^3$ and R$^4$ comply with the general and preferred definitions given above, or via reaction of one or more trialkyl phosphates (MO)$_3$PO, in which M is as defined above, with phosphorus pentoxide P$_2$O$_5$ and with a cyclic ether.

Preference is given in the invention to the production process via reaction of dihydroxy compounds of the formula HO-A-OH, in which A complies with the general and preferred definitions given above, with phosphorus oxychloride POCl$_3$ and with at least one monohydroxy compound M-OH, in which M is a moiety R$^1$, R$^2$, R$^3$ or R$^4$, and R$^1$, R$^2$, R$^3$ and R$^4$ comply with the general and preferred definitions given above.

The present invention further provides a process for the production of the phosphoric ester preparations of the invention, characterized in that an oligomer mixture a) complying with the general or preferred definition given above and at least one phosphoric ester b) complying with the general or preferred definition given above are mixed with one another.

The phosphoric ester preparation of the invention generally comprises from 30 to 70% by weight, preferably from 40 to 60% by weight, of oligomer mixture a) and from 30 to 70% by weight, preferably from 40 to 60% by weight, of at least one phosphoric ester b), based on the entire preparation.

It is preferable that the phosphoric ester preparations of the invention are liquid at about 23° C.

It is preferable that the viscosity of the phosphoric ester preparations of the invention is from 20 to 5000 mPas at 23° C. It is particularly preferable that the viscosity is from 20 to 1000 mPas at 23° C.

The phosphoric ester preparations of the invention can preferably comprise, alongside components a) and b), as required by application sector, one or more auxiliaries, for example from the group of the solvents, antioxidants, stabilizers and colorants. Examples of these auxiliaries that can be used are:

solvents such as alkyl esters of aliphatic or aromatic di- or tricarboxylic acids,
 antioxidants and stabilizers such as sterically hindered trialkylphenols, alkyl esters of 3-(3,5-di-tert-butyl-4-hydroxyphenyl)propionic acid, benzofuran-2-ones, secondary aromatic amines, phosphites, phenothiazines or tocopherols, and
 dyes such as soluble organic colorants, iron oxide pigments or carbon blacks.

The phosphoric ester preparations of the invention are suitable for use as flame retardants and for the production of flame retardant preparations. The present invention further provides the use of the phosphoric ester preparations of the invention as flame retardants.

The phosphoric esters preparations can be used as flame retardants in any of the applications known to the person skilled in the art for flame retardants. It is preferable that the phosphoric ester preparation of the invention is used as flame retardant for synthetic polymers such as polyolefins, polyvinyl chloride, polycarbonates, styrene-based (co)polymers, polyamides, polyesters, polyurethanes, and thermosets such as epoxy resins, unsaturated polyester resins and phenol-formaldehyde resins,
 plant-derived materials, such as wood, wood-plastic composites, paper and paperboard, and
 animal-derived materials such as leather.

It is particularly preferable that the phosphoric ester preparations of the invention are used as flame retardants for polyurethanes. It is very particularly preferable that the phosphoric ester preparations are used as flame retardants for polyurethane foams.

The polyurethane foams are flexible polyurethane foams or rigid polyurethane foams. It is preferable that the phosphoric ester preparations are used as flame retardants for flexible polyurethane foams which are produced from polyether polyols, i.e. flexible polyether-polyurethane foams. In an alternative, likewise preferred, embodiment of the invention the phosphoric ester preparations are used as flame retardants for flexible polyurethane foams which are produced from polyester polyols, i.e. flexible polyester-polyurethane foams.

The present invention further provides polyurethanes which comprise at least one phosphoric ester preparation of the invention. These polyurethanes can be produced in flame-retardant form via suitable selection of the quantity of phosphoric ester preparations present.

The flame-retardant polyurethanes of the invention can be produced by reacting organic polyisocyanates with compounds having at least two hydrogen atoms reactive towards isocyanates with conventional blowing agents, stabilizers, activators and/or other conventional auxiliaries and additives in the presence of at least one phosphoric ester preparation of the invention.

The quantity used of the phosphoric ester preparations of the invention is from 0.5 to 30 parts by weight, preferably from 3 to 25 parts by weight, based on 100 parts by weight polyol component.

The polyurethanes are isocyanate-based polymers which mainly have urethane groups and/or isocyanurate groups and/or allophanate groups and/or uretdione groups and/or urea groups and/or carbodiimide groups. The production of isocyanate-based polymers is known per se and is described by way of example in German Offenlegungschrift 16 94 142, 16 94 215 and 17 20 768, and also in Kunststoff-Handbuch [Plastics handbook] Volume VII, Polyurethane [Polyurethanes], edited by G. Oertel, Carl-Hanser-Verlag Munich, Vienna 1993.

The flame-retardant polyurethanes of the invention are thermoset polyurethanes, polyurethane foams, polyurethane elastomers, thermoplastic polyurethanes, polyurethane coatings and polyurethane lacquers, polyurethane adhesives and polyurethane binders or polyurethane fibres.

In one preferred embodiment of the invention, the flame-retardant polyurethanes of the invention are flame-retardant polyurethane foams.

Polyurethane foams are broadly divided into flexible and rigid foams. Although flexible and rigid foams can in principle have approximately the same envelope density and the same composition, flexible polyurethane foams have only little crosslinking and exhibit only low resistance to deformation under pressure. In contrast to this, the structure of rigid polyurethane foams is composed of highly crosslinked units and rigid polyurethane foam exhibits very high resistance to deformation under pressure. Typical rigid polyurethane foam has closed cells and has low thermal conductivity. Primary factors influencing the subsequent foam structure and foam properties during the production of polyurethanes via reaction of polyols with isocyanates are the structure and molar mass of the polyol, and the reactivity and number (functionality) of hydroxy groups present in the polyol. Further details concerning rigid and flexible foams, the starting materials that can be used to produce these, and also processes for producing the same, are found in Norbert Adam, Geza Avar, Herbert Blankenheim, Wolfgang Friederichs, Manfred Giersig, Eckehard Weigand, Michael Halfmann, Friedrich-Wilhelm Wittbecker, Donald-Richard Larimer, Udo Maier, Sven Meyer-Ahrens, Karl-Ludwig Noble and Hans-Georg Wussow: "Polyurethanes", Ullmann's Encyclopedia of Industrial Chemistry Release 2005, Electronic Release, 7th Edn., Chapter 7 ("Foams"), Wiley-VCH, Weinheim 2005.

Preferred envelope densities of the polyurethane foams of the invention are from 10 to 150 kg/m$^3$. They particularly preferably have envelope densities of from 20 to 50 kg/m$^3$.

Starting components used for the production of the isocyanate-based foams are as follows:

1) Aliphatic, cycloaliphatic, araliphatic, aromatic and heterocyclic polyisocyanates (e.g. W. Siefken in Justus Liebigs Annalen der Chemie, 562, pp. 75-136), for example those of the formula Q(NCO)$_n$, in which n=from 2 to 4, preferably from 2 to 3, and Q is an aliphatic hydrocarbon moiety having from 2 to 18, preferably from 6 to 10, C atoms, a cycloaliphatic hydrocarbon moiety having from 4 to 15, preferably from 5 to 10, C atoms, an aromatic hydrocarbon moiety having from 6 to 15, preferably from 6 to 13, C atoms or an araliphatic hydrocarbon moiety having from 8 to 15, preferably from 8 to 13, C atoms. Particular preference is generally given to the polyisocyanates that derive from tolylene 2,4- and/or 2,6-diisocyanate or from diphenylmethane 4,4'- and/or 2,4'-diisocyanate, these being readily obtainable in industry.

2) Compounds having at least two hydrogen atoms reactive towards isocyanates with molar mass from 400 to 8000 g/mol ("polyol component"). These are not only compounds having amino groups, thiol groups or carboxy groups but also preferably compounds having hydroxy groups, in particular compounds having from 2 to 8 hydroxy groups. If the polyurethane foam is to be a flexible foam, it is preferable to use polyols with molar masses from 2000 to 8000 g/mol and from 2 to 6 hydroxy groups per molecule. If, in contrast, the intention is to produce a rigid foam it is preferable to use highly branched polyols with molar masses from 400 to 1000 g/mol and from 2 to 8 hydroxy groups per molecule. The polyols are polyethers and polyesters, and also polycarbonates and polyesteramides, these being known per se for the production of homogeneous and of cellular polyurethanes, being described for example in German Offenlegungschrift 28 32 253. Preference is given in the invention to the polyesters and polyethers having at least two hydroxy groups.

The polyurethane foams of the invention can therefore be produced in the form of rigid or flexible foams via appropriate selection, easily found in the prior art, of the starting materials.

Other optional starting components are compounds having at least two hydrogen atoms reactive towards isocyanates and molar mass from 32 to 399 g/mol. Again here these are compounds having hydroxy groups and/or amino groups and/or thiol groups and/or carboxy groups, preferably compounds having hydroxy groups and/or amino groups, where said compounds serve as chain extenders or crosslinking agents. These compounds generally have from 2 to 8, preferably from 2 to 4 hydrogen atoms reactive towards isocyanates. Examples of these are likewise described in German Offenlegungschrift 28 32 253.

3) Water and/or volatile organic substances as blowing agent, e.g. n-pentane, isopentane, cyclopentane, acetone, halogenated alkanes, such as trichloromethane, methylene chloride or chlorofluoroalkanes, $CO_2$ and others.

4) Concomitant use is optionally made of auxiliaries and additions such as catalysts of the type known per se, surface-active additives such as emulsifiers and foam stabilizers, reaction retarders, e.g. acidic substances such as hydrochloric acid or organic acyl halides, and also cell regulators of the type known per se, for example paraffins or fatty alcohols and dimethylpolysiloxanes, and also pigments or dyes and other flame retardants, stabilizers to counter effects of ageing and of weathering, core-discoloration inhibitors, plasticizers and fungistatic and bacteriostatic substances, and also fillers such as barium sulphate, kieselguhr, carbon black or purified chalk (German Offenlegungschrift 27 32 292). Particular core-discoloration inhibitors that can be present are sterically hindered trialkylphenols, alkyl esters of 3-(3,5-di-tert-butyl-4-hydroxyphenyl)propionic acid, benzofuran-2-ones, secondary aromatic amines, phosphites, phenothiazines or tocopherols.

The following compounds can also be present as further flame retardants alongside the phosphoric ester preparations of the invention in the polyurethanes of the invention:

organic phosphorus compounds such as triethyl phosphate, triphenyl phosphate, diphenyl cresyl phosphate, tricresyl phosphate, isopropylated or butylated aryl phosphates, aromatic bisphosphates, neopentyl glycol bis(diphenyl phosphate), chlorinated phosphoric esters such as tris(chloroisopropyl) phosphate or tris(dichloropropyl) phosphate, dimethyl methanephosphonate, diethyl ethanephosphonate, dimethyl propanephosphonate, diethylphosphinic acid derivatives and salts of diethylphosphinic acid, other oligomeric phosphates or phosphonates, hydroxylated phosphorus compounds, 5,5-dimethyl-1,3,2-dioxaphosphorinane 2-oxide derivatives, 9,10-dihydro-9-oxa-10-phosphaphenanthrene 10-oxide (DOPO) and its derivatives, inorganic phosphorus compounds such as ammonium phosphate, ammonium polyphosphate, melamine phosphate, melamine polyphosphate, nitrogen compounds such as melamine, melamine cyanurate, bromine compounds such as alkyl esters of a tetrabromobenzoic acid, brominated diols produced from tetrabromophthalic anhydride, brominated polyols, brominated diphenyl ethers, inorganic flame retardants such as aluminium hydroxide, boehmite, magnesium hydroxide, expanded graphite or clay minerals.

Other examples of surface-active additives and foam stabilizers that can optionally be used concomitantly in the invention, and also of cell regulators, reaction retarders, stabilizers, flame-retardant substances, plasticizers, colorants and fillers, and also fungistatic and bacteriostatic substances are described in Kunststoff-Handbuch [Plastics Handbook], Volume VII, Carl-Hanser-Verlag, Munich, 1993, pp. 104 to 123, as also are details concerning the mode of use and of action of these additives.

The present invention further provides a process for the production of polyurethanes via reaction of organic polyisocyanates with compounds having at least two hydrogen atoms reactive towards isocyanates and conventional blowing agents, stabilizers, catalysts, activators and/or other conventional auxiliaries and additives at from 20 to 80° C., by using a quantity of from 0.5 to 30 parts by weight, based on 100 parts by weight of polyol component, of at least one phosphoric ester preparation of the invention. It is preferable that the quantity used of the phosphoric ester preparations is from 3 to 25 parts by weight, based on 100 parts by weight of polyol component.

The process for the production of polyurethanes of the invention is carried out by reacting the reaction components described above in the single-stage process known per se, in the prepolymer process or in the semiprepolymer process, often with use of machinery such as that described in U.S. Pat. No. 2,764,565. Details concerning processing equipment which can also be used in the invention are described in Kunststoff-Handbuch [Plastics Handbook] Volume VII, Polyurethane [Polyurethanes], edited by G. Oertel, Carl-Hanser-Verlag, Munich, Vienna 1993, pp. 139 to 192.

The process of the invention can also produce cold-curing foams (GB Patent 11 62 517, German Offenlegungschrift 21 53 086). However, it is also of course possible to produce foams via block foaming or by the twin-belt process known per se. Polyisocyanurate foams are produced by using the processes and conditions known for that purpose.

The process of the invention permits the production of polyurethane foams in the form of rigid or flexible foams continuously or batchwise, or in the form of foam mouldings. Preference is given to the process of the invention in the production of flexible foams produced via a block foaming process.

The polyurethanes obtainable in the invention are preferably used in furniture cushioning, textile inlays, mattresses, vehicle seats, armrests, components, seat cladding and dashboard cladding, cable sheathing, gaskets, coatings, lacquers, adhesives, adhesion promoters and fibres.

The present invention provides the use of the phosphoric ester preparations of the invention as hydraulic fluids or for the production of hydraulic fluids. It is preferable that the phosphoric ester preparations are used in flame-retardant hydraulic fluids.

The phosphoric ester preparations of the invention can be produced from known components by known methods. The liquid phosphoric ester preparations are easy to meter and are therefore very easy to process. By virtue of the reduced hygroscopicity, there is reduced risk of undesired contamination with water.

The examples below provide further explanation of the invention, but there is no intention that the invention be restricted thereby.

EXAMPLES

Production Example

Oligomer Mixture a) of poly(alkylene phosphates) of the Formula (I) where $R^1=R^2=R^3=R^4=$ethyl and $A=-CH_2CH_2OCH_2CH_2-$ 306.7 parts by weight of phosphorus oxychloride were charged to a reactor with stirrer, dropping funnel, reflux condenser and vacuum equipment. The temperature of the phosphorus oxychloride was controlled to from 10 to 20° C. A vacuum of from 500 to 700 mbar was applied and 118.7 parts by weight of diethylene glycol were added dropwise. Once the dropwise addition had ended, the pressure was lowered further to a final value of from 5 to 15 mbar and the temperature was raised to from 20 to 30° C. The residue was an almost colourless liquid.

618.2 parts by weight of ethanol were used as initial charge at from 20 to 30° C. in another reactor with stirrer, dropping funnel and reflux condenser, and the residue obtained above was admixed. Stirring of the mixture was continued at from 20 to 30° C. until the reaction ended, and the mixture was then neutralized via addition of concentrated aqueous sodium hydroxide solution. A sufficient amount of dichloromethane and water was then added to give two clear liquid phases. These were separated, and the organic phase was freed from the dichloromethane, excess ethanol and water via distillation. The residue was the oligomer mixture of the invention in the form of a colourless liquid. The viscosity of the product was determined at 23° C. by a commercially available falling-ball viscometer, and was 58 [mPas].

Determination of the Average Value of the Number of Repeating Units $\bar{n}$ in the Molecules Corresponding to the Formula (I) Present in the Oligomer Mixture a) in Accordance with Above Production Specification Analysis via gel permeation chromatography (GPC) showed that the product produced according to the above specification was an oligomer mixture. The number-average molar mass $M_n$ of the oligomer mixture was determined via GPC with tetrahydrofuran as eluent against polystyrene standards by a method based on that of DIN 55672-1:2007-08. The average value of the number of repeating units $\bar{n}$ in the poly(alkylene phosphates) corresponding to the formula (I) present in the oligomer mixture was calculated in accordance with the following formula from the number-average molar mass $M_n$ measured:

$$\bar{n}=(M_n-M_E)/M_R$$

where $\bar{n}$: is the average value of the number of repeating units of the poly(alkylene phosphates) of the formula (I) present in the oligomer mixture, $M_n$: is the number-average molar mass in g/mol determined via gel permeation chromatography, $M_E$: is the sum of the molar masses of the terminal groups in g/mol and $M_R$: is molar mass of the repeating unit in g/mol.

For the oligomer mixtures of poly(alkylene phosphates) of the formula (I) produced, where $R^1=R^2=R^3=R^4=$ethyl and $A=-CH_2CH_2OCH_2CH_2-$, the values are $M_E=182.16$ g/mol and $M_R=194.14$ g/mol. The value obtained for $M_n$ was 462 and thus $\bar{n}=1.44$.

Determination of Water Absorption

The oligomer mixture a) produced in accordance with the above specification was used for the Examples. Water absorption was determined on the pure oligomer mixture a) (Comparative Example M-CE1), and also on mixtures of 50% by weight of oligomer mixture a) and 50% by weight of phosphoric ester b) according to Table 1. All of the phosphoric esters listed in Table 1 were commercially obtainable products with acid number <0.1 mg KOH/g. For determination of water absorption, 100 ml of each mixture to be tested were charged to a 250 ml glass beaker (height 12 cm, diameter 6 cm) and placed, uncovered, for 7 days in a chamber under controlled climatic conditions at 23° C. and 50% relative humidity. The water content of the mixtures was determined by means of Karl-Fischer titration in accordance with DIN 51777. Each of the samples was homogenized by stirring before the water determination.

TABLE 1

| Phosphoric esters b) used and water solubility of these | | |
|---|---|---|
| Common name | Chemical name | Solubility in water at 25° C. [g/l] |
| TEP | Triethyl phosphate | miscible |
| TiBP | Triisobutyl phosphate | 0.27 |
| TDCP | Tris(2,3-dichloroisopropyl) phosphate | 0.10 |

TABLE 1-continued

Phosphoric esters b) used and water solubility of these

| Common name | Chemical name | Solubility in water at 25° C. [g/l] |
|---|---|---|
| DPC | Diphenyl cresyl phosphate | 0.0026 |
| RDP | Resorcinol bis(diphenyl phosphate) | 0.0011 |
| TCPP | Tris (2-chloroisopropyl) phosphate | 1.08 |
| TBPP | tert-Butylated triphenyl phosphate | 0.0027 |
| TBEP | Tris(2-butoxyethyl) phosphate | 0.70 |
| IPP | Isopropylated triphenyl phosphate | 0.00033 |

TABLE 2

Water absorption after 7 days for phosphoric ester mixtures of the invention made of 50% by weight of oligomer mixture a) and 50% by weight of phosphoric ester b) (Examples M-IE1 to M-IE8) and Comparative Examples M-CE1 to M-CE2 not of the invention

| Mixture | Neutral phosphoric ester | Water absorption after 7 days [% by weight] |
|---|---|---|
| M-CE1 | — | 2.30 |
| M-CE2 | TEP | 3.09 |
| M-IE1 | TiBP | 1.91 |
| M-IE2 | DPC | 0.91 |
| M-IE3 | IPP | 0.70 |
| M-IE4 | TBPP | 0.87 |
| M-IE5 | RDP | 0.90 |
| M-IE6 | TCPP | 1.24 |
| M-IE7 | TDCP | 0.87 |
| M-IE8 | TBEP | 2.05 |

Evaluation of Water Absorption Results

According to the results listed in Table 2, the oligomer mixture a) alone (Comparative Example M-CE1) exhibits considerable water absorption under the test conditions. In the absence of complicated precautions, the product rapidly absorbs a quantity of water that can be problematic in industrial applications.

The phosphoric ester preparations M-IE1 to M-IE8 of the invention exhibit markedly lower water absorption than the oligomer mixture a) alone. They therefore feature reduced hygroscopicity, and this is an advantage in water-sensitive industrial applications.

In contrast, the mixture M-CE2, not of the invention, made of the oligomer mixture a) and of the phosphoric ester triethyl phosphate with water solubility of more than 3.0 g/l at 25° C. absorbs markedly more water than the oligomer mixture a) alone, and therefore has markedly poorer suitability for water-sensitive industrial applications.

Production of Flexible Polyurethane Foams

TABLE 3

Raw materials used for the production of flexible polyether-polyurethane foams

| Component | Function | Description |
|---|---|---|
| A | Polyol | Arcol ® 1105 (Bayer MaterialScience), polyether polyol with OHN 56 mg KOH/g |
| B | Blowing agent | Water |
| C | Catalyst | Addocat 108 ® (Rhein Chemie), 70% solution of bis(2-dimethylaminoethyl) ether in dipropylene glycol |
| D | Catalyst | Addocat ® SO (Rhein Chemie), tin(II) 2-ethylhexanoate |
| E | Stabilizer | Tegostab ® B 8232 (Degussa), silicone stabilizer |
| M | Flame retardant | Phosphoric ester preparations from Table 2 |
| G | Diisocyanate | Desmodur ® T 80 (Bayer MaterialScience), tolylene diisocyanate, isomer mixture |

Production of Flexible Polyether-Polyurethane Foams

Table 3 states the raw materials for the production of flexible polyether-polyurethane foams. The components stated in terms of type and quantity in Table 4, with the exception of the diisocyanate (component G), were mixed to give a homogeneous mixture. The diisocyanate was then added and incorporated by brief vigorous stirring. After a cream time of from 15 to 20 s and a full rise time of from 170 to 200 s, a flexible polyether-polyurethane foam was obtained with envelope density 33 kg/m³. Uniformly fine-pored foams were obtained in all of the Examples.

Determination of Flame Retardancy

The flexible polyurethane foams (polyether and polyester) were tested in accordance with the specifications of the Federal Motor Vehicle Safety Standards FMVSS 302 and allocated to the fire classes SE (self-extinguishing), SE/NBR (self-extinguishing/no burning rate), SE/BR (self-extinguishing/with burning rate), BR (burning rate) and RB (rapid-burning). The fire tests were carried out five times for each Example. The worst result from each series of five has been reported in Table 4.

TABLE 4

Composition (parts by weight) and test results for Examples IE1 to IE2 of the invention and for Comparative Examples CE0 to CE1, not of the invention, relating to flexible polyether-polyurethane foams

| Example | CE0 | CE1 | IE1 | IE2 |
|---|---|---|---|---|
| A | 100 | 100 | 100 | 100 |
| B | 3.0 | 3.0 | 3.0 | 3.0 |
| C | 0.08 | 0.08 | 0.08 | 0.08 |
| D | 0.16 | 0.16 | 0.16 | 0.16 |
| E | 0.80 | 0.80 | 0.80 | 0.80 |
| M-CE1 | | 6 | | |
| M-IE4 | | | 6 | |
| M-IE5 | | | | 6 |
| G | 40.9 | 40.9 | 40.9 | 40.9 |
| MVSS class | RB | SE | SE | SE |

Evaluation of Results Relating to Flexible Polyether-Polyurethane Foams

In the absence of a flame retardant (Comparative Example CE0) the flexible polyurethane foam is rapidly consumed by combustion (MVSS fire class RB). Foams with an oligomer mixture a) alone (Comparative Example CE1), and also with the phosphoric ester preparations of the invention (Inventive Examples IE1 and IE2) achieve the best MVSS fire class SE (self-extinguishing) when six parts of flame retardant are used.

Examples IE1 and IE2 show that the phosphoric ester preparations of the invention with reduced hygroscopicity exhibit the same flame-retardant effect as the known hygroscopic oligomer mixtures a) alone.

Production of Flexible Polyester-Polyurethane Foams

Table 5 states the raw materials for the production of flexible polyester-polyurethane foams. The components stated in terms of type and quantity in Table 6, with the exception of the two diisocyanates (components G and H), were mixed to give a homogeneous mixture. The two premixed diisocyanates were then added and incorporated by brief vigorous stirring. After a cream time of from 10 to 15 s and a full rise time of from 70 to 80 s, a flexible polyester-polyurethane foam was obtained with envelope density 29 kg/m$^3$. The foam structure of the flexible polyester-polyurethane foams was dependent on the flame retardants used. It is recorded in Table 6 as "uniformly fine-pored" ("uf") or "non-uniformly coarse-pored" ("nc").

TABLE 5

Raw materials used for the production of flexible polyester-polyurethane foams (Inventive Examples IE6 and IE7 and Comparative Examples CE2 to CE4, not of the invention)

| Component | Function | Description |
|---|---|---|
| A | Polyol | Desmophen ® 2200 B (Bayer MaterialScience), polyester polyol with OHN 60 mg KOH/g |
| B | Blowing agent | Water |
| C | Catalyst | Niax ® A-30 (Momentive), amine |
| D | Catalyst | Addocat ® 117 (Rhein Chemie), tertiary amine |
| E | Stabilizer | Tegostab ® B 8324 (Degussa), silicone stabilizer |
| M-IE4 and M-IE5 | Flame retardant | Phosphoric ester preparations from Table 2 |
| M-CE3 | Flame retardant | Mixture of 50% by weight of Fyrol ® PNX from ICL-IP (oligomeric phosphate esters of the formula EtO—[P(=O)OEt—CH$_2$CH$_2$—]$_n$—P(=O)(OEt)$_2$, CAS Reg. No. 184538-58-7, M$_n$ = 640 g/mol from GCP (see above), average value of the number of repeating units n̄ = 3.01; viscosity 1241 mPas at 23° C.) with 50% by weight of RDP |
| G | Diisocyanate | Desmodur ® T 80 (Bayer MaterialScience), tolylene diisocyanate, isomer mixture |
| H | Diisocyanate | Desmodur ® T 65 (Bayer MaterialScience), tolylene diisocyanate, isomer mixture |

TABLE 6

Composition (parts by weight) and test results for Examples IE3 to IE4 of the invention and for Comparative Examples CE2 to CE4, not of the invention, relating to flexible polyester-polyurethane foams

| Example | CE2 | CE3 | CE4 | IE3 | IE4 |
|---|---|---|---|---|---|
| A | 100 | 100 | 100 | 100 | 100 |
| B | 4.0 | 4.0 | 4.0 | 4.0 | 4.0 |
| C | 0.25 | 0.25 | 0.25 | 0.25 | 0.25 |
| D | 0.25 | 0.25 | 0.25 | 0.25 | 0.25 |
| E | 1.0 | 1.0 | 1.0 | 1.0 | 1.0 |
| M-CE1 | | 6 | | | |
| M-CE3 | | | 6 | | |
| M-IE4 | | | | 6 | |
| M-IE5 | | | | | 6 |
| G | 24.1 | 24.1 | 24.1 | 24.1 | 24.1 |
| H | 24.1 | 24.1 | 24.1 | 24.1 | 24.1 |
| Foam structure | uf | uf | nc | uf | uf |
| MVSS class | RB | SE | — | SE | SE |

Evaluation of the Results Relating to Flexible Polyester-Polyurethane Foams

In the absence of a flame retardant (Comparative Example CE2) the flexible polyester-polyurethane foam features a uniformly fine-pored foam structure, but is rapidly consumed by combustion (MVSS fire class RB). Addition of 6 parts of an oligomer mixture a) alone in accordance with the production specification stated above (Comparative Example CE3) does not alter the foam structure and permits achievement of the best MVSS fire class SE (self-extinguishing). However, the high hygroscopicity of the pure oligomer mixture a) M-CE1 is disadvantageous.

A mixture described in WO 2001/018088 A1, made of an oligomer mixture of poly(alkylene phosphate) of the formula EtO-[P(=O)OEt-CH$_2$CH$_2$—]$_n$—P(=O)(OEt)$_2$ (M-CE3; CAS Reg. No. 184538-58-7, average value of the number of repeating units n̄=3.01) and RDP in a ratio by mass of 1:1 cannot be successfully processed to give a flexible polyester-polyurethane foam (Comparative Example CE4). The foam is non-uniformly coarse-pored and thus unusable. This shows that the mixture M-CE3 from the prior art is not compatible with polyester polyols.

In contrast to this, the phosphoric ester preparations of the invention (Inventive Examples IE3 and IE4) permit the production of foams with the desired, uniformly fine-pored foam structure. Inventive Example IE4 uses the phosphoric ester preparation M-IE5 of the invention which, like M-CE3, comprises 50% by weight of RDP as phosphoric ester b), and is therefore directly comparable with Comparative Example CE4. The foams from Inventive Examples IE3 and IE4 achieve the best MVSS fire class SE (self-extinguishing) with 6 parts of flame retardant.

Examples IE3 and IE4 show that the phosphoric ester preparations of the invention with reduced hygroscopicity have good processability with polyester polyols and exhibit the same flame-retardant effect as the known hygroscopic oligomer mixtures a) alone.

What is claimed is:

1. A polyurethane comprising a phosphoric ester preparation comprising:
   i) an oligomer mixture a) comprising at least three poly (alkylene phosphates) corresponding to the formula (I)

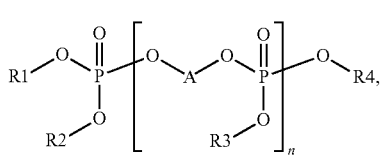
(I)

in which

R$^1$, R$^2$, R$^3$ and R$^4$ are respectively mutually independently a straight-chain or branched C$_1$- to C$_8$-alkyl moiety or a straight-chain or branched C$_1$- to C$_4$-alkoxyethyl moiety, A is a straight-chain, branched and/or cyclic C$_4$- to C$_{20}$-alkylene moiety, a moiety of the formula —CH$_2$—CH═CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$—, or a moiety of the formula —(CHR$^5$—CHR$^6$—O)$_c$—R$^9$—(O—CHR$^7$—CHR$^8$)$_d$—, in which a is an integer from 1 to 5, b is an integer from 0 to 2, c and d are mutually independently an integer from 1 to 5, R$^5$, R$^6$, R$^7$ and R$^8$ are mutually independently H or methyl, and R$^9$ is a moiety of the formula —CH$_2$—CH═CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

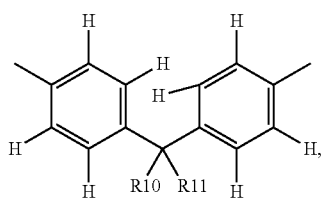
(II)

a moiety of the formula (III)

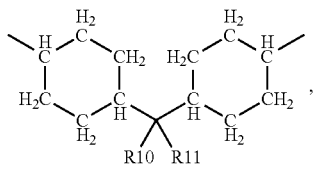
(III)

a moiety of the formula (IV)

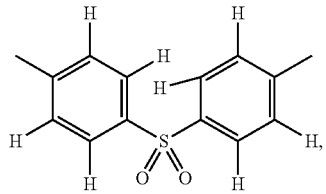
(IV)

or a moiety of the formula —C(═O)—R$^{12}$—C(═O)—, where

R$^{10}$ and R$^{11}$ are respectively mutually independently H or C$_1$- to C$_4$-alkyl or R$^{10}$ and R$^{11}$ together are an optionally alkyl-substituted ring having from 4 to 8 C atoms, and R$^{12}$ is a straight-chain, branched and/or cyclic C$_2$- to C$_8$-alkylene moiety, a 1,2-phenylene moiety, a 1,3-phenylene moiety, or a 1,4-phenylene moiety, and n is an integer from 0 to 100, with the proviso that the at least three poly(alkylene phosphates) of the formula (I) differ from one another at least in the number n of the repeating units, and the average value of the number of the repeating units n̄ of the at least three poly(alkylene phosphates) of the formula (I) is greater than 1.10 and smaller than 2.00, and ii) at least one phosphoric ester b) selected from the group of tris(2,3-dichloroisopropyl) phosphate, diphenyl cresyl phosphate, resorcinol bis(diphenyl phosphate), tert-Butylated triphenyl phosphate and isopropylated triphenyl phosphate, wherein the phosphoric ester preparation comprises from 30 to 70% by weight of the oligomer mixture a) and from 30 to 70% by weight of the at least one phosphoric ester b), based on the entire preparation.

2. The polyurethane according to claim 1, wherein the oligomer mixture a) comprises at least three poly(alkylene phosphates) of the formula (I), in which:

R$^1$, R$^2$, R$^3$ and R$^4$ are respectively mutually independently a straight-chain or branched C$_1$- to C$_4$-alkyl moiety or a C$_1$- or C$_2$-alkoxyethyl moiety, A is a straight-chain or branched C$_4$- to C$_{10}$-alkylene moiety, a moiety of the formula —CH$_2$—CH═CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$—, or a moiety of the formula —(CHR$^5$—CHR$^6$—O)$_c$—R$^9$—(O—CHR$^7$—CHR$^8$)$_d$—, in which:

a is an integer from 1 to 5, b is an integer from 0 to 2, c and d are mutually independently an integer from 1 to 5, R$^5$, R$^6$, R$^7$ and R$^8$ are mutually independently H or methyl, and R$^9$ is a moiety of the formula —CH$_2$—CH═CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

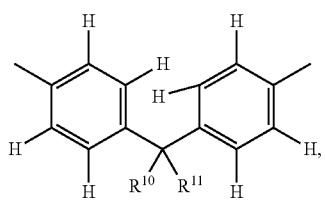

a moiety of the formula (II)

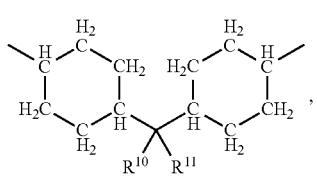

a moiety of the formula (III)

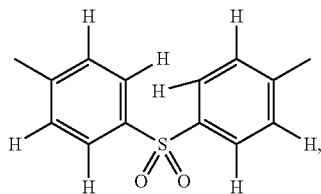

or a moiety of the formula —C(=O)—R$^{12}$—C(=O)—, where:
R$^{10}$ and R$^{11}$ are respectively mutually independently H or C$_1$- or C$_2$-alkyl, and
R$^{12}$ is a straight-chain or branched C$_2$- to C$_6$-alkylene moiety, a 1,2-phenylene moiety, a 1,3-phenylene moiety, or a 1,4-phenylene moiety, and
n is an integer from 0 to 100.

3. The polyurethane according to claim 1, wherein the oligomer mixture a) comprises at least three poly(alkylene phosphates) of the formula (I), in which:
R$^1$, R$^2$, R$^3$ and R$^4$ are respectively mutually independently a straight-chain or branched C$_1$- to C$_4$-alkyl moiety, or an n-butoxyethyl moiety,
A is a straight-chain C$_4$- to C$_6$-alkylene moiety, a moiety of the formula —CH$_2$—CH=CH—CH$_2$—, a moiety of the formula —CH$_2$—C≡C—CH$_2$—, a moiety of the formula —CHR$^5$—CHR$^6$—(O—CHR$^7$—CHR$^8$)$_a$—, a moiety of the formula —CHR$^5$—CHR$^6$—S(O)$_b$—CHR$^7$—CHR$^8$—, or a moiety of the formula —(CHR$^5$—CHR$^6$—O)$_c$—R$^9$—(O—CHR$^7$—CHR$^8$)$_d$—, in which:
a is an integer from 1 to 5,
b is an integer from 0 to 2,
c and d are mutually independently an integer from 1 to 5,
R$^5$, R$^6$, R$^7$ and R$^8$ are mutually independently H or methyl, and
R$^9$ is a moiety of the formula —CH$_2$—CH=CH—CH$_2$—, a moiety of the formula —CH$_2$—C≡C—CH$_2$—, a 1,2-phenylene moiety, a 1,3-phenylene moiety, a 1,4-phenylene moiety, or a moiety of the formula (II)

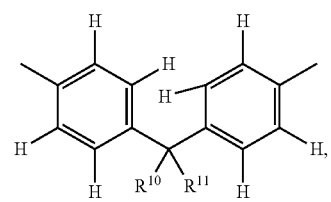

a moiety of the formula (III)

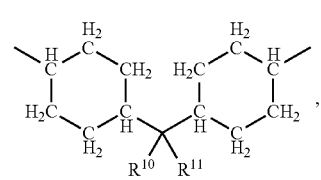

a moiety of the formula (IV)

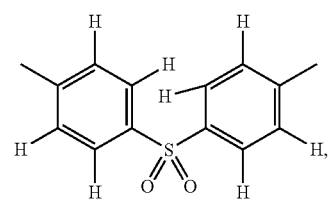

or a moiety of the formula —C(=O)—R$^{12}$—C(=O)—, where
R$^{10}$ and R$^{11}$ are respectively mutually independently H or C$_1$- or C$_2$-alkyl, and
R$^{12}$ is a straight-chain or branched C$_2$- to C$_6$-alkylene moiety, a 1,2-phenylene moiety, a 1,3-phenylene moiety, or a 1,4-phenylene moiety, and
n is an integer from 0 to 100.

4. The polyurethane according to claim 1, wherein the oligomer mixture a) comprises at least three poly(alkylene phosphates) of the formula (I), in which:
R$^1$, R$^2$, R$^3$ and R$^4$ are identical and are ethyl, n-propyl, isopropyl, n-butyl, isobutyl or n-butoxyethyl,
A is a straight-chain C$_4$- to C$_6$-alkylene moiety, or a moiety of the formulae

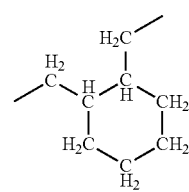

(V)

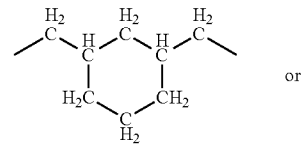

(VI)

or

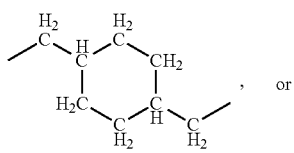
, or (VII)

a moiety —CHR$^5$—CHR$^6$—(O—CHR$^7$—CHR$^8$)$_a$—, in which a is an integer from 1 to 2 and R$^5$, R$^6$, R$^7$ and R$^8$ are identical and are H, or a moiety —(CHR$^5$—CHR$^6$—O)$_c$—R$^9$—(O—CHR$^7$—CHR$^8$)$_d$—, in which c and d are mutually independently an integer from 1 to 2, R$^5$, R$^6$, R$^7$ and R$^8$ are identical and are H, and R$^9$ is a moiety of the formula (II), where R$^{10}$ and R$^{11}$ are identical and are methyl, and n is an integer from 0 to 20.

5. The polyurethane according to claim 1, wherein the phosphoric ester preparation is liquid with a dynamic viscosity of 20 to 5000 mPas at 23° C.

6. The polyurethane according to claim 1, wherein the phosphoric ester preparation comprises from 40 to 60% by weight of the oligomer mixture a) and from 40 to 60% by weight of the at least one phosphoric ester b), based on the entire preparation.

7. The polyurethane according to claim 1, wherein the phosphoric ester preparation comprises one or more auxiliaries selected from the group of the solvents, antioxidants, stabilizers, and colorants.

8. The polyurethane according to claim 1, wherein the polyurethane is a polyurethane foam.

9. The polyurethane according to claim 8, wherein the polyurethane foam is a flexible polyurethane foam based on polyether polyols or on polyester polyols.

10. A process for producing the polyurethane according to claim 1, the process comprising contacting organic polyisocyanates, in the presence of the phosphoric ester preparation and conventional blowing agents, stabilizers, activators and/or other conventional auxiliaries and additives, at a temperature of 20 to 80° C., with compounds having at least 2 hydrogen atoms reactive towards isocyanates.

11. The process according to claim 10, wherein 0.5 to 30 parts by weight of the phosphoric ester preparation is used, based on 100 parts by weight of polyol component.

12. An article of manufacture comprising the polyurethane according to claim 1, wherein the article of manufacture comprises furniture cushioning, textile inlays, mattresses, vehicle seats, armrests, components, seat cladding, dashboard cladding, cable sheathing, gaskets, coatings, lacquers, adhesives, adhesion promoters, and fibres.

* * * * *